United States Patent [19]
Lee

[11] Patent Number: 5,142,604
[45] Date of Patent: Aug. 25, 1992

[54] SYSTEM AND METHOD FOR PICTURE INTERPHONE USING CAMCORDER AND TV

[75] Inventor: Seoung E. Lee, Kyongki Do, Rep. of Korea

[73] Assignee: Gold Star Co., Ltd., Seoul, Rep. of Korea

[21] Appl. No.: 673,590

[22] Filed: Mar. 22, 1991

[30] Foreign Application Priority Data

Mar. 22, 1990 [KR] Rep. of Korea ............... 3894/1990

[51] Int. Cl.$^5$ ............................................. H04N 7/18
[52] U.S. Cl. ................................. 358/108; 358/85; 358/86
[58] Field of Search ............... 358/108, 85, 86, 209, 358/227

[56] References Cited
U.S. PATENT DOCUMENTS
4,959,713  9/1990  Morotomi et al. ................... 358/108

FOREIGN PATENT DOCUMENTS
0242482  10/1986  Japan .
0296871  12/1986  Japan .
0042689   2/1987  Japan .
0092688   4/1987  Japan .
0005679   1/1988  Japan .
0090983   4/1988  Japan .
0226185   9/1988  Japan .
0260384  10/1988  Japan .
0166686   6/1989  Japan .
0218283   8/1990  Japan .

Primary Examiner—James J. Groody
Assistant Examiner—Michael L. Lee

[57] ABSTRACT

A picture interphone system uses existing an TV and camcorder without any special equipment. The system is able to record a picture of a visitor while the user is not at home or when the user wants to record the picture of the visitor. The camcorder and the TV are turned on by the signal of a switch pushed by the visitor and automatically turns off after the visitor has left.

21 Claims, 8 Drawing Sheets

SYSTEM AND METHOD FOR PICTURE INTERPHONE USING CAMCORDER AND TV

BACKGROUND OF THE INVENTION

The present invention relates to a picture interphone system for monitoring visitors, and more particularly to a picture interphone system that uses TV and Camcorder for recording and monitoring the picture of the visitor. After the visitor has gone away, the system automatically turns off.

There are two types of conventional interphone systems. The first conventional picture interphone system includes a camera, monitor, and its ancillary parts. It is usually used at home. The user can watch the visitor on his own monitor accompanied by an alarm, when the visitor pushes the button of the system. Such a conventional interphone system can not record a picture of the visitor. A second type of the conventional interphone system includes a camera, recorder, monitor, and its ancillary parts. It is usually used in order to monitor or record the picture of the visitor at a security place, for example, a bank or the laboratory. However, such a conventional picture interphone system must be turned on during all the time when the user wants to record the picture of the visitors. These conventional picture interphone systems are used only for their own exclusive use as picture interphone systems.

SUMMARY OF THE INVENTION

Accordingly it is an object of the present invention to provide a picture interphone system the use of existing TV and Camcorder without using special equipment as required in a conventional picture interphone system.

Another object of the present invention is to provide a picture interphone system which is capable of recording the picture of the visitor while a user is not at home or when the user wants to record the picture of the visitor.

A further object of the present invention is to provide a picture interphone system having a TV automatically turned on and off for monitoring by the signal of a switch actuated by the visitor. In the present invention monitoring and recording the picture of the visitor can be operated at the same time.

BRIEF DESCRIPTION OF THE DRAWINGS

The foregoing and further objects, features and advantages of the present invention will be understood more completely from the following detailed description of presentely preferred, illustrated, embodiments of the present invention with reference to the accompanying drawings, in which:

FIG. 6(a) and (b) is a flow chart of picture interphone system of FIG. 4.

DETAILED DESCRIPTION OF THE PREFERRED EMBODIMENTS

Referring now to the details of the drawings, FIGS. 1, 2, and 3(a) and 3(b) illustrate a preferred embodiment of a picture interphone system using existing TV and Camcorder embodying the present invention, wherein like reference characters designate corresponding parts throughout several views of the drawings. The system includes an interphone power switch (SW1), a camcorder (1) which has a microprocessor (1-1), an auto-focus control means (1-2), a melody output means (1-3), a camcorder power control means (1-4), a camera means (1-5), a record/reproduce means (1-6), a camcorder power switch (SW2), a monitor/record switch (SW3), an external jack for 1 (EXJ1), an external jack for 2 (EXJ2), a video output port, and a audio output port, and a TV (2) which has a TV power control means (2-1) and a TV/monitor selector (2-2). A camcorder (1) is located where it can capture a picture of a visitor. An interphone switch (SW1) is connected to the camcorder (1) through an external jack (EXJ1) of the camcorder (1). A microprocessor (1-1) of the camcorder (1) controls the present system. An auto-focus control means (1-2) is connected to the microprocessor for controlling the lens of the camcorder the use of a focus motor not shown. A camcorder power control means (1-4) for controlling the power of the camcorder is connected to the microprocessor. A camcorder power switch (SW2) is connected to the microprocessor. A monitor/record switch (SW3) which can be selected to a monitor mode or a record mode by the user is connected to the microprocessor (1-1). A melody output means (1-3) for outputting a signal in order to alarm the user is connected between the microprocessor (1-1) and a TV/monitor selector of a TV (2) through one of external jacks (EXJ2). A TV power control means (2-1) for turning on/off the TV by the signal of a microprocessor (1-1) is connected to the microprocessor (1-1) through one of external jacks (EXJ2). There is a TV/Monitor selector (2-2) which, in case of the user's watching TV program, can convert the TV to a monitor mode for the user to observe the visitor. The selector (2-2) is connected to the microprocessor (1-1), a video out port, and an audio output port of the camcorder through external jacks (EXJ2).

The operation of the picture interphone system in accordance with a preferred embodiment of the present invention, will be described in the following description with reference to the drawings, FIGS. 2 to 3(a) and 3(b).

Figure 2:
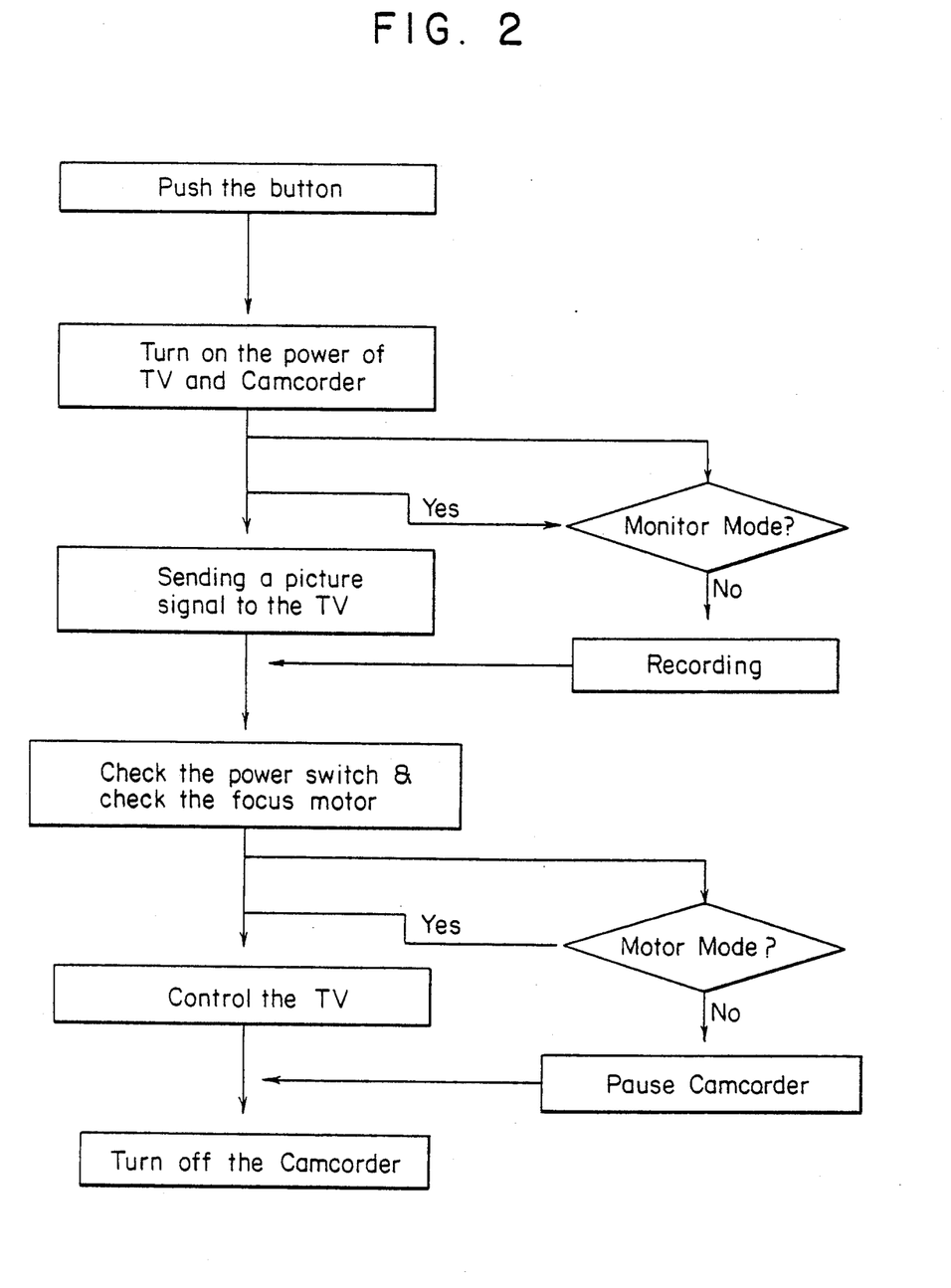
FIG. 2 is a schematic flow chart of picture interphone system of FIG. 1.

FIG. 2 is a schematic flow chart in accordance with the preferred embodiment of the present invention. When the interphone switch 1 (SW1) is pushed by a visitor, the power of the camcorder (1) is turned on. It is determined whether or not the monitor/record switch is in the monitor mode. When a monitor/record switch is on the monitor mode, which is the state that allows the user to watch the visitor through the TV at home, the microprocessor of the camcorder sends control signal and melody signal to the TV for turning on the TV, switching the TV/monitor output means of the TV to the monitor mode, and alarming the user by the melody signal. If the monitor/record switch isn't on the monitor mode, which is the state that the user can not watch the visitor through the TV at home and wants the camcorder to record the picture of the visitor, the camcorder (1) starts recording. It is checked whether or not the camcorder power switch (SW2) is turned off by the user and whether or not the auto-focus control means has been stopped for a certain period. When the camcorder power switch (SW2) is turned off or the auto-focus control means has been stopped for the certain time, the camcorder is set to an initial mode which is the state that this system is ready to operate at any time. The TV/monitor selector is switched to the TV mode and/or the TV is turned off.

Figure 1:
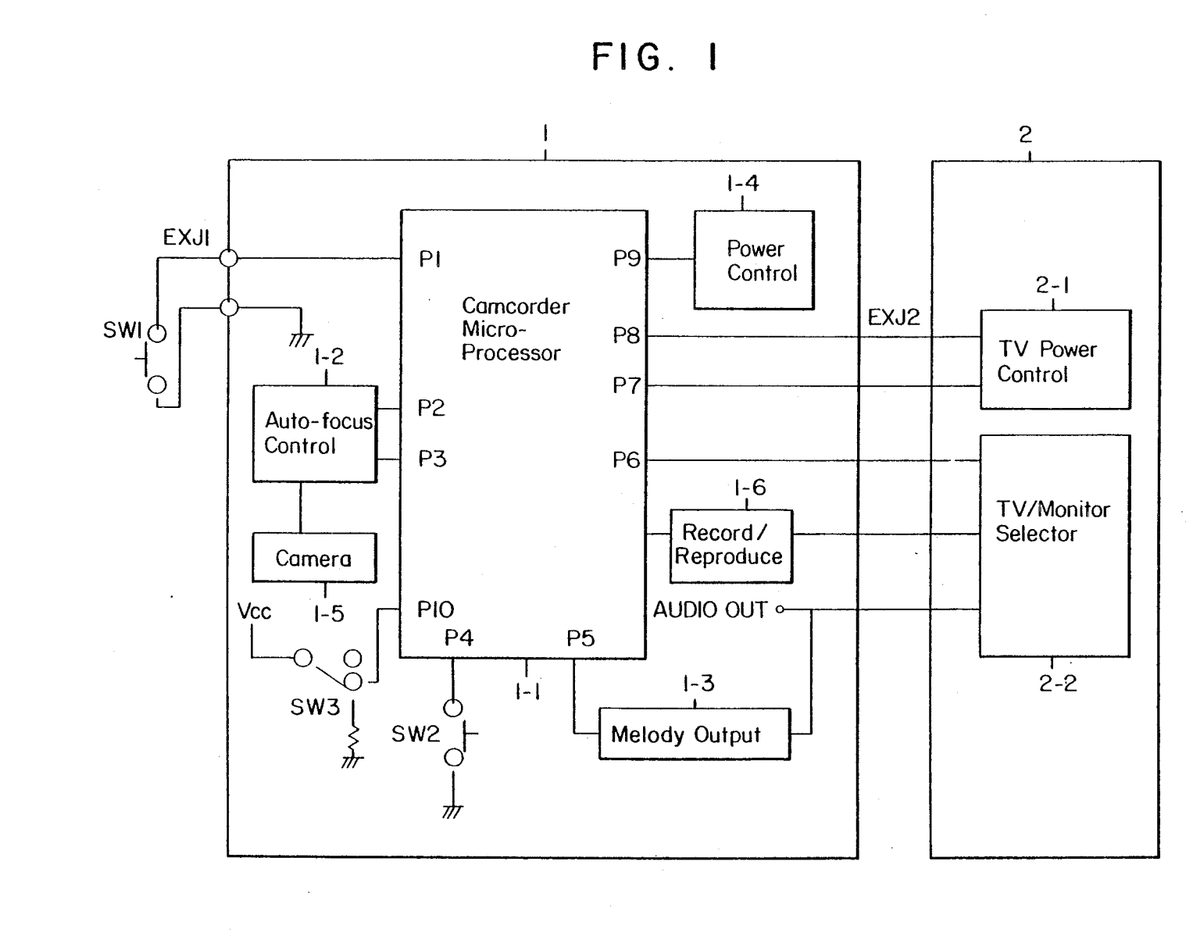
FIG. 1 is a block diagram of a preferred embodiment of picture interphone system in accordance with the present invention.
Figure 3:
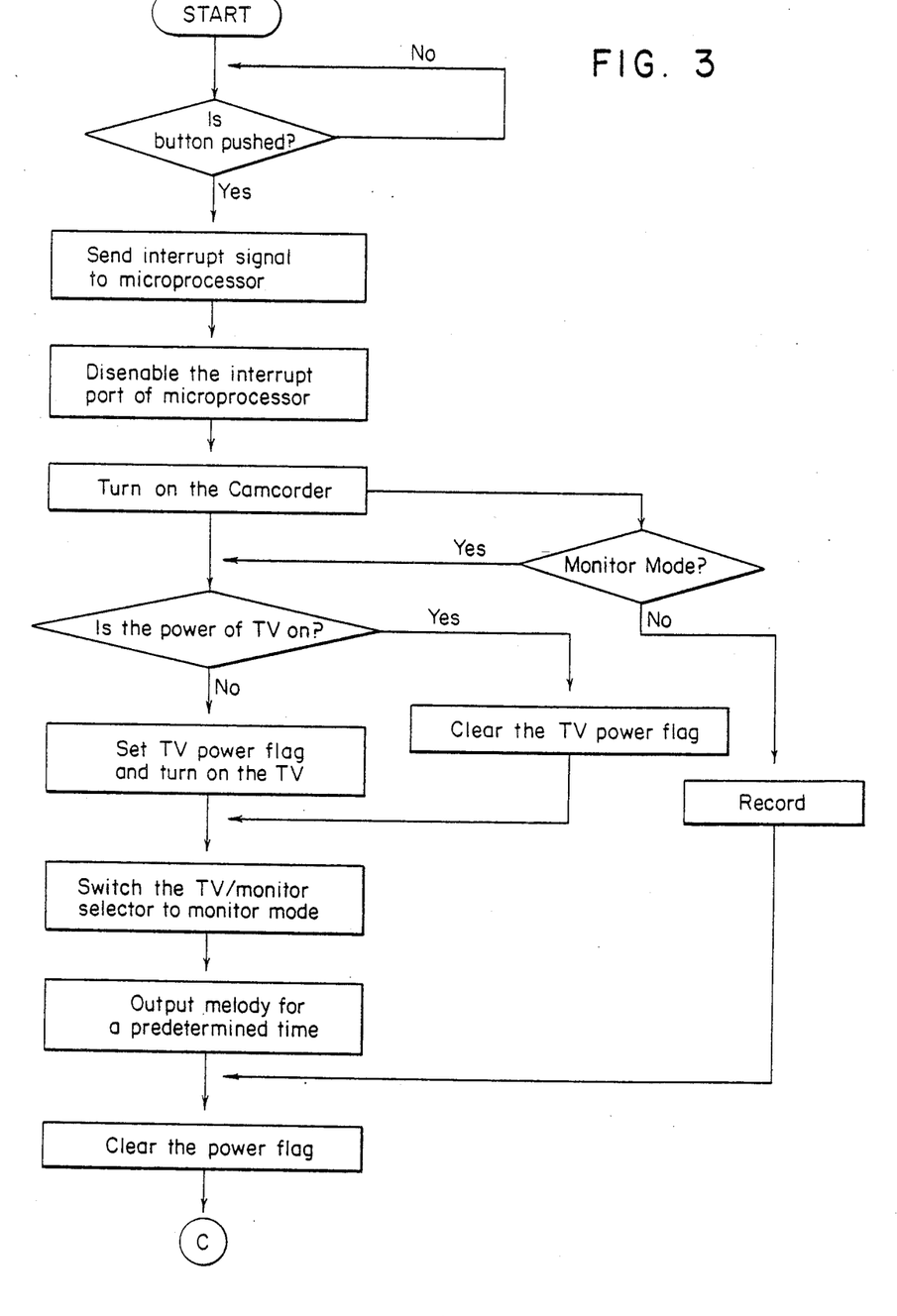
FIGS. 3(a) and 3(b) are a flow chart of picture interphone system of FIG. 1.
Figure 3B:
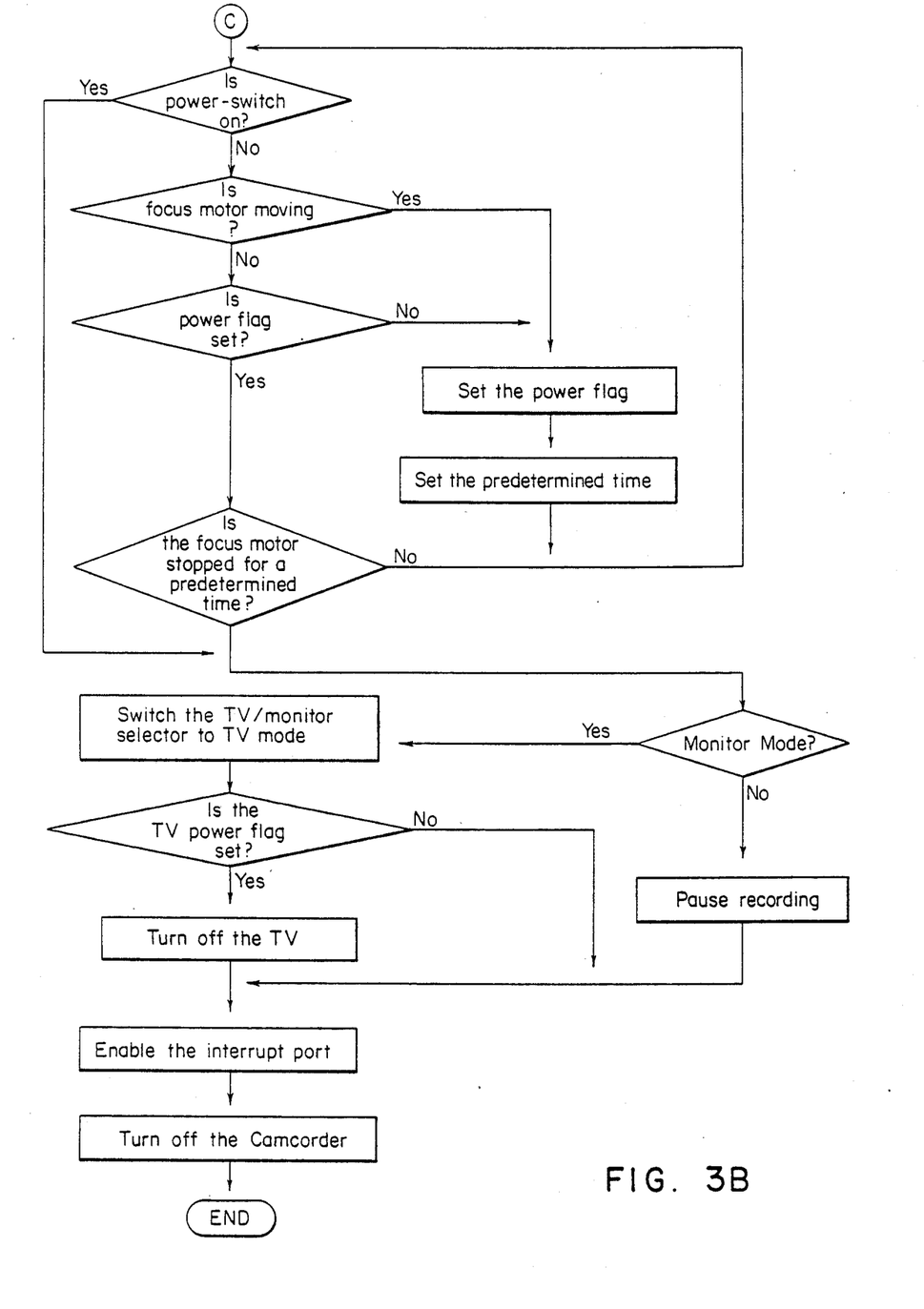
Figure 4:
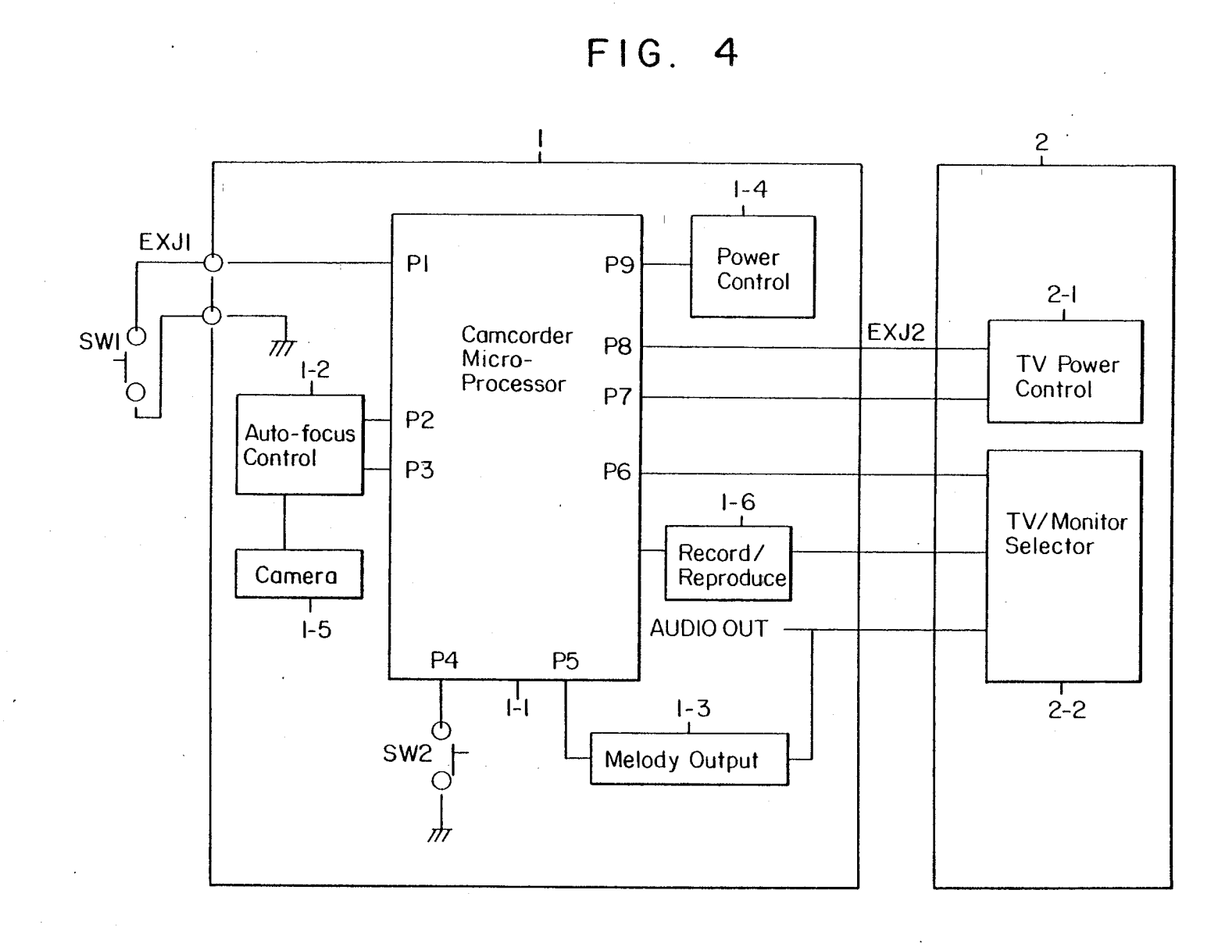
FIG. 4 is a block diagram of an alternative preferred embodiment of picture interphone system in accordance with the present invention.
Figure 5:
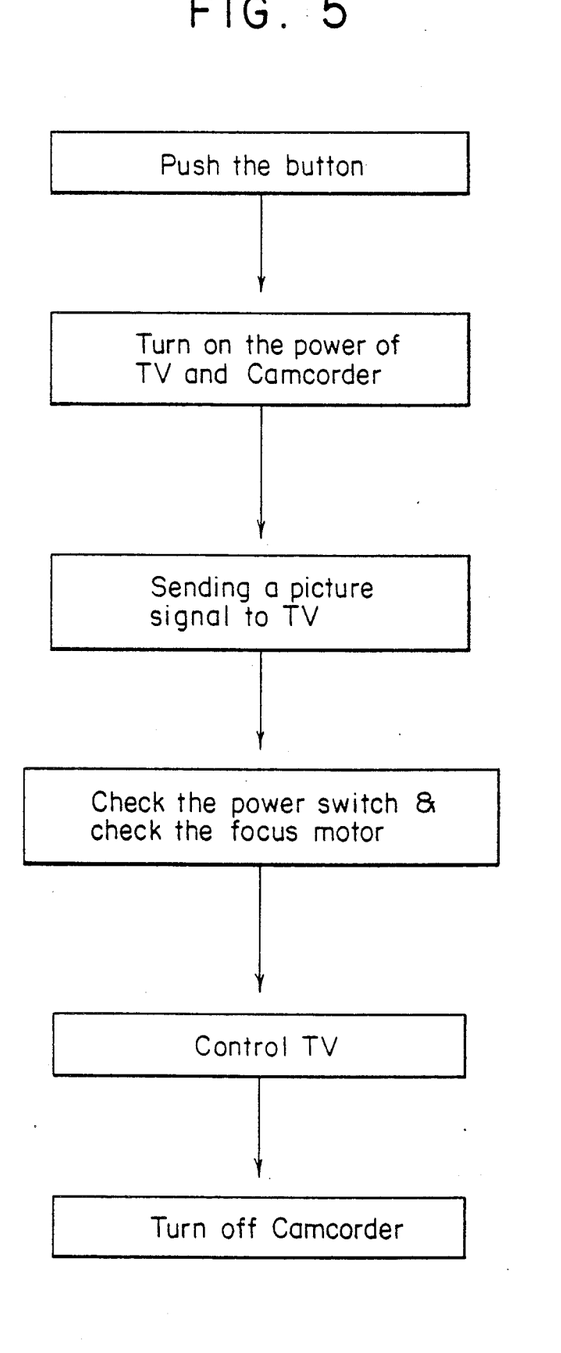
FIG. 5 is a schematic flow chart of picture interphone system of FIG. 4.
Figure 6:
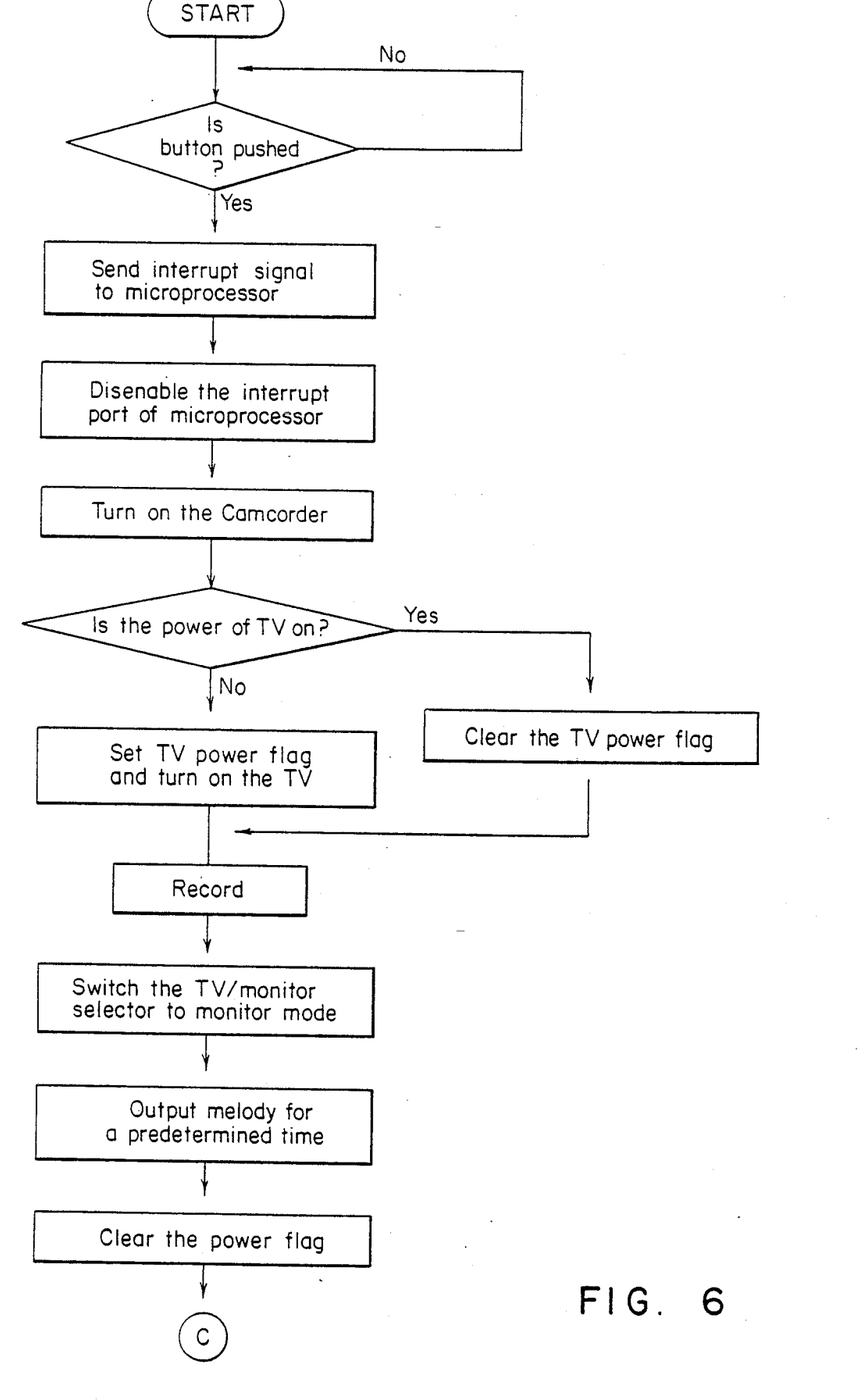
Figure 6B:
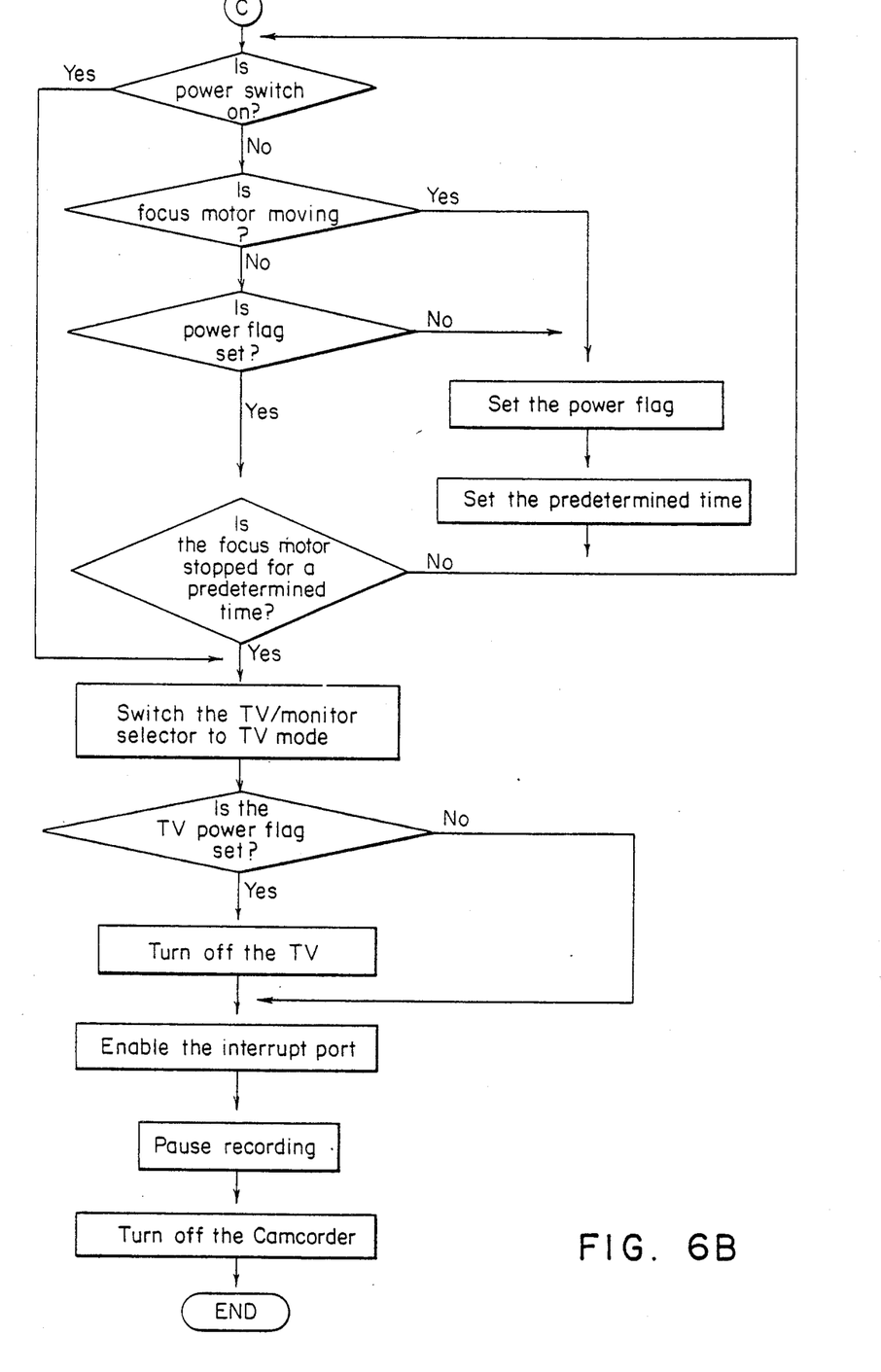

FIG. 3(a) and (b) is a control flow chart in accordance with the invention as shown in the FIG. 1. When the interphone switch is pushed by the visitor, an interrupt signal occurs through a interrupt port (P1) of a microprocessor (1-1). The microprocessor (1-1) disables the interrupt port (P1), so the operation of the present invention can be maintained not to be started again even if the interphone switch (SW1) is periodically and continuously pushed by the user. Then the power of the camcorder (1) is turned on through the camcorder power control means (1-4). It is determined whether or not a monitor/record switch (SW3) is on monitor mode. When the monitor/record switch is on monitor mode which is the state that the user can monitor, a TV power control means (2-1) is checked to be on or off. If the power of TV is off, TV is turned on and TV power flag is set for power-off after the monitor operation is finished. If TV power is on, the power flag is cleared and a TV/monitor selector (2-2) is set to monitor mode. Then the picture captured by camcorder (1) can be monitored through TV (2). A melody output means (1-3) outputs the melody signal for alarming the user to monitor the visitor. After starting to output the melody signal and the picture of the visitor, the melody output means stops outputting the melody signal in a predetermined time. When the monitor/record switch (SW3) is on record mode which is the state that the user wants to record the visitor, for example, if the user is out, the camcorder (1) starts recording the picture of the visitor. Then the camcorder power flag is cleared for automatic power-off. It is checked whether a power switch (SW2) is on or off. When the user pushes the power switch (SW2) after watching the visitor, the power of the camcorder is turned off. If the power switch (SW2) is not pushed, it is checked whether a focus motor is running or stopping for a certain time. In case that there is any movement of the visitor, the focus motor operates continuously. In case that the focus motor does not operate in certain period, which means that the visitor has returned, then the focus motor does not move and then the system goes power-off system. It is determined whether the monitor/recorder switch (SW3) is on monitor mode. If the switch 3 is on record mode, the recording operation is paused. If the switch 3 is on monitor mode, the TV/monitor selector (2-2) is returned to TV mode, and then it is checked whether TV power flag is set. When TV power flag is set, the power of TV is turned off. That is, the TV is turned to initial state that the power of TV is off after TV is turned on for monitoring. That is, the TV is turned to initial state that the power of TV is off after TV is turned on for monitoring. After the recording of camcorder is paused or if the TV power flag is cleared, the interrupt port (P1) of the microprocessor is enabled to be able to receive the switching signal of the system switch (SW1). And the power of camcorder is turned off.

Referring to, FIGS. 4, 5, and 6(a) and 6(b) illustrate a modified embodiment of the present invention. This second embodiment it provides a means for operating two operation simultaneously, which are (1) recording of camcorder and (2) monitoring through TV.

As described above, the present invention could be used as a picture interphone system by using an existing camcorder and TV without using a special picture interphone system. This is described, for example, as follows.

In a case that the user goes away from home, the user set the monitor/record switch (SW3) of the camcorder to record mode. Then the camcorder records the picture of the visitor until the visitor leaves. The user can check the visitor by reviewing the recorded tape. In another case, when the user is watching TV, when the visitor pushes the button, the TV is turned to a monitor mode so the visitor can be observed. Then the user can turn off the power of camcorder when the user welcomes the visitor. Alternatively, the user might let the camcorder be automatically turned off after the visitor leaves because the user does not want to meet the visitor. Then the TV, which has been on monitor mode, is turned to TV mode again for the user's use. In another case when the power of TV is off, when the visitor pushes the TV is turned on and switched to monitor mode so the visitor can be checked. Then the user can turn off the power of camcorder or let it automatically turn off. Then the TV is switched to TV mode and turned off again. In another embodiment of the present invention is to provide the picture interphone system which can operate recording and monitoring at the same time. In a further embodiment of the present invention the picture interphone system has a multi-switch for selecting a plurality of operations which are a first operation that said recording means records and the user can also watch TV program and a second operation that said recording means records and the user can also watch the picture of the visitor. A third operation in that said recording means records, a fourth operation is that the user monitors the picture of the visitor, a fifth operation that the user watches the TV program and the picture of the visitor, and a sixth operation that the user watches the TV program and the picture of the visitor, and the picture of the visitor is recorded.

Although the preferred embodiments of the invention have been disclosed for illustrative purposes, those skilled in the art will appreciate that various modifications, additions, and substitutions are possible, without departing from the scope and spirit of the invention as disclosed in the accompanying claims.

What is claimed is:

1. A system for a picture interphone comprising:
   a button, connected to a microprocessor for sending a signal;
   a camcorder operatively connected to the button, which comprises;
      a camcorder power control means for controlling the power of said camcorder,
      a camera means for capturing a picture of a visitor and sending said signal to the microprocessor,
      an auto-focus means for automatically controlling the focus of said picture, wherein said auto-focus means is connected between the microprocessor and said camera means;
   said microprocessor controlling said picture interphone system, wherein said microprocessor, by the signal from the button, disenables an interrupt port, sends a signal to said camcorder power control means and a TV power control means for turning on said camcorder and a TV, and sends a signal for turning off said camcorder and said TV when said focus of said picture is set for a predetermined time;
a television set operatively connected to said camcorder which comprises:
a monitor means for showing said picture by the signal of said microprocessor, and
a TV power control means for turning on or off said TV set by a signal of said microprocessor; and a switch for turning on or off said system by the user.

2. The system for a picture interphone according to claim 1, wherein said camcorder further comprises a melody means for ouputting an alarm signal.

3. The system for a picture interphone according to claim 1, wherein said TV set further comprises a TV/monitor selector for selecting a TV signal or a monitor signal of said microprocessor.

4. The system for a picture interphone according to claim 3, wherein the camcorder further comprise a melody means for outputting an alarm signal.

5. A system for a picture interphone, comprising:
a button, connected to a microprocessor, for sending a signal;
camcorder power control means for controlling the power of said system;
camera means for capturing a picture of a visitor and sending said signal to the microprocessor;
an auto-focus means for automatically controlling the focus of said picture, wherein said auto-focus means is connected between the microprocessor and said camera means;
a recording means for recording the picture of a visitor, connected to the microprocessor; and
said microprocessor controlling said picture interphone system, wherein said microprocessor, upon receiving a signal from the button, disenables an interrupt port, sends a signal to said camcorder power control means for turning on said system, sends a picture signal to said recording means, and sends a signal to said power control means and said recording means for turning off said system and said recording means when said focus of said picture is set for a predetermined time.

6. The system for a picture interphone according to claim 5, wherein said system further comprises a reproducing means connected to the microprocessor for reproducing the picture recorded by said recording means.

7. The system for a picture interphone according to claim 5, wherein said system further comprises:
a television set operatively connected to said camcorder which comprises:
a monitor means for showing said picture by the signal of said microprocessor, and
a TV power control means for turning on or off said TV set by a signal of said microprocessor; and
a switch for turning on or off said system by a user.

8. The system for a picture interphone according to claim 7, wherein said system further comprises a reproducing means connected to microprocessor for reproducing the picture recorded by said recording means.

9. The system for a picture interphone according to claim 7, wherein said system further comprises a record/monitor switch connected to said microprocessor so that when the user wants to record the picture of the visitor, said record/monitor switch is turned to record mode, and said record/monitor switch is turned to monitor mode when the user wants to watch the picture of the visitor.

10. The system for a picture interphone according to claim 7, wherein said system further comprises:
means for selecting the operation which respectively operates recording or monitoring, or the operation which operates said recording and monitoring at the same time.

11. The system for a picture interphone according to claim 8, wherein said system further comprises:
means for selecting the operation which respectively operates recording or monitoring, or the operation which operates said recording and monitoring at the same time.

12. A system for a picture interphone, comprising:
a button, connected to a microprocessor, for sending a signal;
a camcorder which comprises:
camcorder power control means for controlling the power of said camcorder,
camera means for capturing a picture of a visitor and sending said signal to the microprocessor,
auto-focus means for automatically controlling the focus of said picture, said auto-focus means connected between a microprocessor and said camera means,
recording means for recording the picture of the visitor, connected to the microprocessor, and
said microprocessor, upon receiving a signal from the button, controlling said picture interphone system, said microprocessor disenables an interrupt port, sends a signal to said camcorder power control means and a TV power control means for turning on said camcorder and a TV, and sends a signal for turning off said camcorder and said TV when said focus of said picture is set for a predetermined time;
monitor means for showing said picture by the signal of said microprocessor,
TV power control means for turning on or off said TV set by a signal of said microprocessor, and
a TV/monitor selector for selecting a TV signal or monitor signal of said microprocessor;
a switch for turning on or off said system by the user; and
a record/monitor switch connected to said microprocessor, wherein, when the user wants to record the picture of the visitor, said record/monitor switch is turned to record mode, and said record/monitor switch is turned to monitor mode when the user wants to watch the picture of the visitor.

13. The system for a picture interphone according to claim 12, wherein said system further comprises a reproducing means connected to microprocessor for reproducing the picture recorded by said recording means.

14. The system for a picture interphone according to claim 12, wherein said system further comprises a melody means for outputting an alarm signal.

15. The system for a picture interphone according to claim 12, wherein said system further comprises a multi-switch for selecting a plurality of operations which are;
a first operation that said recording means records and the user can also watch TV program;
a second operation that said recording means records and the user can also watch the picture of the visitor;
a third operation that said recording means records;

a forth operation that the user monitor the picture of the visitor;

a fifth operation that the user watch the TV program and the picture of the visitor; and a sixth operation that the user watch the TV program and the picture of the visitor, and the picture of the visitor is recorded.

16. A method for a picture interphone, comprising the steps of:
   (a) determining whether or not a button is pushed by a visitor;
   (b) turning on said picture interphone when said button is pushed;
   (c) recording the picture of said visitor with use of a recording means of a camcorder;
   (d) determining whether an auto-focus control means is stopped for a predetermined time; and
   (e) turning off said picture interphone when said auto-focus control means is stopped for a predetermined time.

17. A method for a picture interphone, comprising the steps of:
   (a) determining whether or not a button is pushed by a visitor;
   (b) turning on a camera and a TV when said button is pushed;
   (c) switching a TV/monitor selector to monitor mode for showing the picture of the visitor through a monitor of TV;
   (d) sending a picture signal to said TV;
   (e) determining whether an auto-focus control means is stopped for a predetermined time;
   (f) switching a TV/monitor selector to TV mode for sending a TV program signal to said monitor of TV when said auto-focus control means is stopped for a predetermined time; and
   (g) turning off said camera and TV after step (f).

18. A method for a picture interphone according to claim 17, further comprises the step of:
   (h) outputting a melody for alerting the user that a visitor has actuated said button after said step of turning on.

19. A method for a picture interphone according to claim 17, further comprises the step of:
   determining whether a power switch is turned on after the step of sending, wherein the step of turning off is met when said power switch is turned on, or the determining step is met when said power switch is not turned on.

20. A method for a picture interphone according to claim 18, further comprises the step of:
   (i) outputting a melody for alerting the user that a visitor has actuated said button after said step of turning on.

21. A method for a picture interphone, comprising the steps of:
   (a) determining whether or not a button is pushed by a visitor;
   (b) turning on a camera when said button is pushed;
   (c) determining whether or not a record/monitor switch is on record mode;
   (d) determining whether the power of TV is on when said record/monitor selector is on monitor mode;
   (e) turning on a TV when power of said TV is off;
   (f) switching a TV/monitor selector to monitor mode for showing the picture of the visitor through a monitor of TV when said TV is turned on;
   (g) sending a picture signal to said TV;
   (h) recording the picture of said visitor with use of a recording means of said camcorder if said record/monitor selector is on record mode;
   (i) determining whether an auto-focus control means is stopped for a predetermined time;
   (j) switching a TV/monitor selector to TV mode for sending TV program signal to said monitor for the TV when said auto-focus control means is off for a predetermined time;
   (k) stopping recording when said auto-focus control means is stopped for a predetermined time and if said record/monitor selector is on record mode;
   (l) turning off said camera after stopping step; and
   (m) turning off said camera after stopping step if said TV is not turned on at the step of determining whether the TV is on.

* * * * *